US009458710B2

(12) United States Patent
Makarychev-Mikhailov et al.

(10) Patent No.: US 9,458,710 B2
(45) Date of Patent: Oct. 4, 2016

(54) HYDRAULIC FRACTURING SYSTEM

(75) Inventors: Sergey Mikhailovich Makarychev-Mikhailov, St. Petersburg (RU); Richard D. Hutchins, Sugar Land, TX (US); Christopher N. Fredd, Ashville, NY (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 866 days.

(21) Appl. No.: 13/520,331

(22) PCT Filed: Dec. 31, 2009

(86) PCT No.: PCT/RU2009/000757
§ 371 (c)(1),
(2), (4) Date: Oct. 1, 2012

(87) PCT Pub. No.: WO2011/081550
PCT Pub. Date: Jul. 7, 2011

(65) Prior Publication Data
US 2013/0014946 A1    Jan. 17, 2013

(51) Int. Cl.
*E21B 43/267* (2006.01)
*C09K 8/80* (2006.01)
*C09K 8/62* (2006.01)

(52) U.S. Cl.
CPC .............. *E21B 43/267* (2013.01); *C09K 8/62* (2013.01); *C09K 8/80* (2013.01); *C09K 8/805* (2013.01)

(58) Field of Classification Search
CPC .... C09K 8/80; C09K 8/805; C09K 2208/10; C09K 8/62; C09K 8/685; C09K 8/68; C09K 8/035; E21B 43/267; E21B 43/26
See application file for complete search history.

(56) References Cited

U.S. PATENT DOCUMENTS

| 3,399,727 A | 9/1968 | Graham et al. |
| 4,547,468 A | 10/1985 | Jones et al. |
| 6,330,916 B1 | 12/2001 | Rickards et al. |
| 6,776,235 B1 | 8/2004 | England |
| 7,220,454 B2 | 5/2007 | Barron et al. |

(Continued)

FOREIGN PATENT DOCUMENTS

| CN | 1274376 A | 11/2000 |
| CN | 1671945 A | 9/2005 |

(Continued)

OTHER PUBLICATIONS

American Petroleum Institue, "Recommended practices for evaluating short term proppant pack", API Recommended Practice 61, Oct. 1989, 21 pages.

(Continued)

*Primary Examiner* — Zakiya W Bates
(74) *Attorney, Agent, or Firm* — Jeremy D. Tillman; Tim Curington; Michael Flynn

(57) ABSTRACT

A method is given for fracturing a formation, in particular far-field in a tight formation, in which at least a portion of the proppant is crushable in situ at some point during pumping, during fracture closure, or at higher stresses experienced later during fracture closure. The closure stress or hydrostatic stress is estimated, then a proppant is selected that is at least partially crushable at that closure stress, and then the fracturing treatment is performed with at least a portion of the total proppant being the selected crushable proppant.

18 Claims, 6 Drawing Sheets

(56) References Cited

U.S. PATENT DOCUMENTS

| | | |
|---|---|---|
| 2006/0177661 A1 | 8/2006 | Smith et al. |
| 2007/0154268 A1 | 7/2007 | Barron et al. |
| 2007/0166541 A1 | 7/2007 | Smith et al. |
| 2007/0202318 A1 | 8/2007 | Smith et al. |
| 2008/0135245 A1 | 6/2008 | Smith et al. |
| 2008/0217010 A1 | 9/2008 | Blackburn et al. |
| 2011/0180259 A1 | 7/2011 | Willberg et al. |

FOREIGN PATENT DOCUMENTS

| | | |
|---|---|---|
| CN | 101371005 A | 2/2009 |
| CN | 101605846 A | 12/2009 |
| WO | WO0005302 | 2/2000 |
| WO | 2006032008 A2 | 3/2006 |
| WO | WO2007086771 | 8/2007 |
| WO | WO2008008625 | 1/2008 |
| WO | WO2008101209 | 8/2008 |

OTHER PUBLICATIONS

American Petroleum Institute, "Recommended practices for testing sand used in hydraulic fracturing operations", API Recommended Practice 56, Second Edition, Dec. 1995, 19 pages.

Bulova, et al., "Evaluation of the Proppant-Pack Permeability in Fiber-Assisted Hydraulic Fracturing Treatments for Low-Permeability Formations", SPE 100556—SPE Gas Technology Symposium, Calgary, Alberta, Canada, May 15-17, 2006, 5 pages.

HYDRAULIC FRACTURING SYSTEM

This application claims priority as a U.S. National Stage Application to Patent Cooperation Treaty (PCT) Application No. PCT/RU2009/000757, filed Dec. 31, 2009. The disclosure of the priority application is incorporated by reference herein in its entirety.

BACKGROUND OF THE INVENTION

Hydraulic fracturing is an effective method of increasing hydrocarbon production. The method involves pumping of a fracturing fluid into a subterranean formation (i.e. reservoir) through a wellbore under a pressure exceeding the formation stress. A propping material is placed in the resulting fractures to prevent them from closing, which, thus, provides unimpeded flow paths and enhanced transport of hydrocarbons from the reservoir to the wellbore.

The art of hydraulic fracturing is based to a great extent on materials: the fluids with their various constituents and the proppants with optional auxiliary particulates. The proppant materials are intended to provide enhanced hydraulic conductivity of a fracture under the formation closure stress. Proppant design is focused on several material characteristics that include: a) compressive strength or crush resistance under formation closure stress, to avoid generation of fines, which are known to damage proppant pack conductivity; b) low specific gravity, to place the proppant deep into a fracture with a fluid of reasonable viscosity; c) substantially spherical proppant particulate shape with smooth particle surface and uniform size distribution to maximize proppant pack permeability; and d) low material cost. There is usually a trade-off between the properties. As an example, proppant crush resistance, which is a characteristic of material mechanical strength, often conflicts with the required proppant low density and low cost. The choice of proppant also strongly depends on the properties of the targeted reservoir, which can vary significantly. Therefore, while proppant pack conductivity is often considered as a primary proppant characteristic, in certain cases, it can be sacrificed to achieve other benefits. In very tight reservoirs, even very low fracture conductivity will still result in a suitable flow path for hydrocarbons entering from the formation.

It would be desirable to have an inexpensive proppant that is readily transported deep into fractured formations by low viscosity fluids and need not have low specific gravity, particle size or shape uniformity, or strength.

SUMMARY OF THE INVENTION

One embodiment of the invention is a method of hydraulic fracturing a subterranean formation penetrated by a wellbore including the steps of (a) estimating the closure stress in a fracture, (b) selecting a crushable proppant that produces more than about 20 percent fines in a crush test using that closure stress, and (c) injecting a slurry of the proppant in a carrier fluid into the formation. The crushable proppant may be, for example, in the form of spheres, plates, disks, rods, cylinders, platelets, flakes, sheets, scales, husks, chips, shells, lumps and mixtures thereof. The crushable proppant may be a mixture of particles of at least two different shapes that have at least two different crush strengths. The crushable proppant may include particles of at least two different materials that have at least two different crush strengths. The crushable proppant may be entirely or partially ceramic hollow spheres, glass or ceramic microspheres and microballoons, cenospheres, plerospheres and combinations of those materials. The crushable proppant may be partially or entirely made of materials with dosed porosity, such as glass and ceramics, rocks and minerals, polymers and plastics, metals and alloys, composite materials, biomaterials and combinations of those materials. The materials with closed porosity may have fibrous, arch/cellular, mesh, mesh/cellular, honeycomb, bubble, sponge-like or foam structures and combinations of these structures. The crushable proppant may be made of finer material that has been formed into larger particles by agglomeration or binding. The crushable proppant may be coated. The crushable proppant may be used at a concentration of from about 10 to about 100% of the total solids in the slurry. The crushable proppant should produce more than about 10 percent, preferably more than about 15 percent, fines in a crush test using the closure stress of the formation.

In other embodiments of the invention, step (c) is followed by injection of a slurry in which the proppant is not crushable. A cycle of alternating proppant types may be repeated a plurality of times. The non-crushable proppant should generate less than about 6 to about 20 percent fines in a crush test using the closure stress of the formation, for example as delineated in API RP56 for various mesh sizes of proppant. Optionally, a portion of the crushable proppant may be crushed during step (c) and/or a portion of the crushable proppant may be crushed when the fracture closes after step (c).

In other embodiments, the formation may have a permeability of less than about 0.001 mD and the proppant loading may be less than about 4.88 $kg/m^2$. The proppant optionally includes at least 10 weight percent of mica or cenospheres or mixtures of those materials. Optionally, the proppant may be continuously added to a carrier fluid injected into the formation. The crush strength of the material may be chosen so that at least a portion of the crush occurs after initial cleanup of the well. The surface treating pressures may be reduced relative to injecting conventional proppant at similar proppant concentrations. The settling velocity may be less than that of 150 micron sand.

Yet another embodiment is a method of hydraulic fracturing a subterranean formation penetrated by a wellbore including the steps of (a) estimating the hydraulic pressure to which materials will be exposed during pumping, (b) selecting a crushable proppant that produces more than about 20 percent fines in a crush test using that hydraulic pressure, and (c) injecting a slurry of the proppant in a carrier fluid into the formation. The hydrostatic pressure may be changed during the step of injecting to control crushing of the crushable proppant material, for example the rate of injection may be increased.

DETAILED DESCRIPTION OF THE INVENTION

Figure 1:
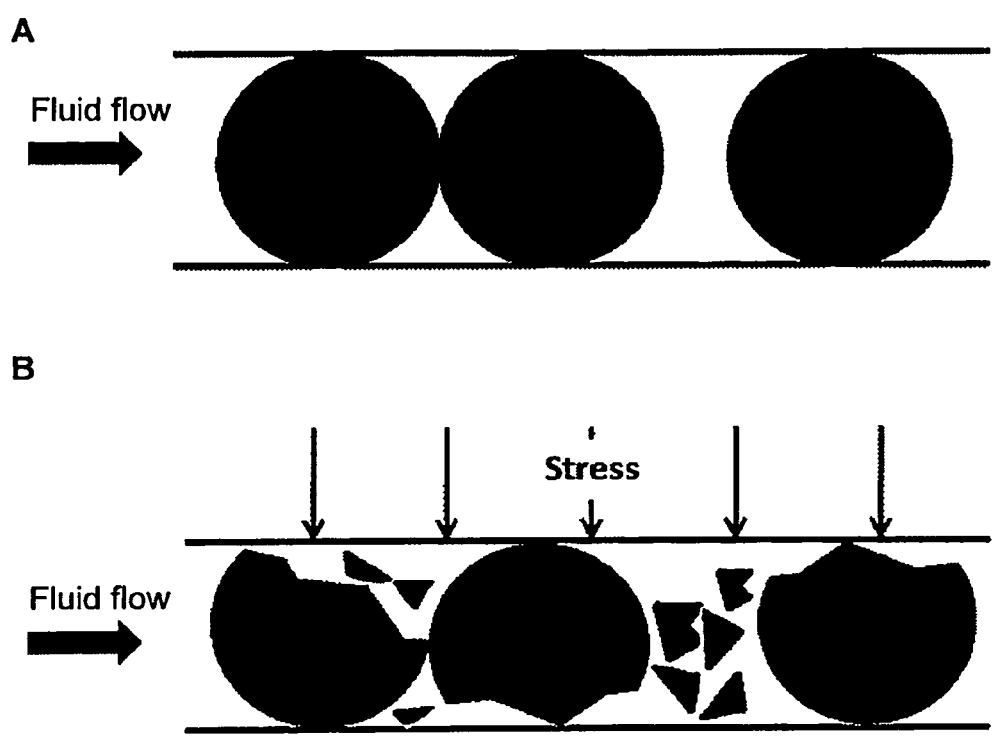
FIG. 1 shows spherical proppant particles having a diameter just smaller than a tube.

Although the following discussion emphasizes fracturing far into tight formations, the proppants and methods of the Invention may be used in any fracturing setting. The invention will be described in terms of treatment of vertical wells, but is equally applicable to wells of any orientation. The invention will be described for hydrocarbon production wells (gas, oil, condensate), but it is to be understood that the invention may be used for wells producing other fluids, such as water or carbon dioxide, or, for example, for injection or storage wells. It should also be understood that throughout this specification, when a concentration or amount range is described as being useful, or suitable, or the like, it is intended that any and every concentration or amount within the range, including the end points, is to be considered as having been stated. Furthermore, each numerical value should be read once as modified by the term "about" (unless already expressly so modified) and then read again as not to be so modified unless otherwise stated in context. For example, "a range of from 1 to 10" is to be read as indicating each and every possible number along the continuum between about 1 and about 10. In other words, when a certain range is expressed, even if only a few specific data points are explicitly identified or referred to within the range, or even when no data points are referred to within the range, it is to be understood that the inventors appreciate and understand that any and all data points within the range are to be considered to have been specified, and that the inventors have possession of the entire range and all points within the range.

We have found methods of hydraulic fracturing utilizing crushable particulates, which provide sufficient and cost effective fracture conductivity insignificantly dependent on closure stress. Furthermore, such particulates can also be used to deliver proppant far-field (deep into the reservoir away from the wellbore) into a complex fracture network, where no high strength proppants can be placed via current practices. Potential applications of the crushable particulates include unconventional reservoirs, for example tight gas shales, because the required proppant conductivity in such reservoirs can be relatively low and the proppant transport properties become much more important. (The term proppant is used here to refer to materials with sufficient compressive strength to hold a fracture open.) In one embodiment of the invention, crush of the spherical or non-spherical particulates leads to relative increase of effective porosity in the pack, due to opening of flow channels. The closure stress impact on the proppant pack conductivity is significantly diminished, as with pack compression and decrease of the total pack porosity, the fraction of effective porosity increases. In another embodiment of the invention, hollow and/or highly porous lightweight particulates are delivered deep into a fracture, wherein they are crushed with a formation closure stress, and still provide sufficient conductivity to the fracture, as it is propped with fragments of the initial particulates.

All proppants are crushable at some closure stress, so proppants may inadvertently have been used above their crush strengths in the past. This has always been considered deleterious to treatment effectiveness and success, but we have now discovered that under certain circumstances it may be advantageous to estimate the closure stress that will be experienced in a proposed fracturing treatment and then to select a proppant that will be substantially crushed under those circumstances Not all proppants are suitable as the crushable proppants of the invention; they should have certain properties as injected, such as slow settling, and certain properties when crushed. For example, the base material may have sufficient strength to support the formation stresses, but may have defects in the structure and/or in the mechanical design or structure of the material that results in weak points that will break under formation closure stress. Generation of fines upon crushing when using large proppant sizes can be a problem, as fines restrict the conductivity of large-proppant packs. In the present invention, however, particles are selected to crush during pumping to create small particles that transport effectively or during fracture closure to create adequate conductivity. Relevant properties include size and shape; mixtures of different sizes and/or shapes can be used. Also, crush resistance for some of the shapes should be less than the available stress. When using a mixture of shapes, some shapes should have substantially different crush strengths and may exceed the available stress. For example, a hollow sphere proppant material that crushes under hydrostatic pressure can be used to create small, strong particles that transport effectively and support formation closure stresses.

It is widely accepted that proppant crush is highly undesirable, as it leads to formation of fines, which fill pores of the proppant pack, thus decreasing its hydraulic conductivity. Significant efforts have been made in the past to develop high strength proppants (HSP) and many such products are available commercially. Most HSP's are based on ceramic materials and are characterized by relatively high cost and high specific gravity.

Preferred plate-like proppants are layered rocks and minerals; most preferred is mica, for example muscovite mica. Some of these materials may be crushable and suitable for use in the present Invention.

We define a plate-like particle as one which possesses three average dimensions in which the largest dimension is at least two times the smallest dimension and the third dimension can be smaller or equal to the largest dimension. Thus, discs with a thickness of less than one-half the diameter qualify as plate-like particles. Rod-like and fiber-like particles can also be used. Preferably, such particles should have an aspect ratio of at least about 2, most preferably at least about 3; preferably they should have a maximum length of about 5 mm, most preferably about 3 mm. Such particles can be made, for example, of glass or ceramics or may be of natural origin, for example basalt fibers, asbestos fibers and the like.

Another trend in proppant development targets lightweight and ultra lightweight particulates. These proppants are intended for use in unconventional reservoirs (i.e. gas shales, tight gas sands), where slickwater is used as a fracturing fluid. Slickwater is typically a dilute solution of a friction reducer (a polymer is added to decrease pumping pressure), the viscosity of which generally does not exceed about 10 mPa-s. Slickwater treatments are pumped in large volumes in gas shales to create complex fracture networks, which are believed to enhance gas production. As delivery of a proppant into the fracture network with a fluid of low viscosity is challenging, the conventional approach to proppant development for slickwater treatments is to reduce the proppant specific gravity. Lightweight proppants based on polymer composites have been commercialized; they commonly have specific gravities of from about 1.08 to about 1.25 g/cm³. The main problem with these proppants is their cost, but they are technically suitable for the present Invention.

Therefore, other suitable proppants are described in U.S. Pat. No. 4,547,468 which discloses hollow fine-grained ceramic proppants, that have a crushing strength equal to or greater than that of Ottawa sand at closure stresses above 5000 psi (34.5 MPa). Also suitable, U.S. Pat. No. 7,220,454 and U.S. Patent Application Publication 20070154268 describe high strength polycrystalline ceramic spheres and methods of making hollow spheres of alumina or aluminate by coating of polymeric beads with alumoxane, heating the particles to convert alumoxane to alumina, removal of the polymeric beads from inside the coating by washing with a solvent, and sintering the resulted hollow particles to give high strength α-alumina spheres. Also suitable as proppants in the Invention are those described in U. S. Patent Application Publication Nos. 20070154268, 20070166541, 20070202318, and 20080135245; these disclose proppants having a suitable crush resistance and/or buoyancy as shown by specific gravity. These proppants generally are made with a template material and a shell on the template material; the shell is a ceramic material or oxide thereof or a metal oxide. The template material may be a hollow sphere and may be a single particle, such as a cenosphere.

The concept of the present Invention differs from the aforementioned patents and patent applications, and others describing hollow lightweight proppants, by utilization of the hollow particle as a transport vehicle for the true proppant only. The proppant material in the present invention is not the particles themselves, but rather their fragments. Such an approach completely changes the design of the proppant material, as there is no need to reinforce the particulates, but rather they may be crushable, and chosen to provide the best possible conductivity of the crushed material.

The stress distribution in a pack of spherical particles is usually quite uniform; however, above critical compressive stresses the particles start crushing. While proppant particle crushing has previously been believed to be bad for the pack permeability, this is not necessarily true. One can consider a simple notional experiment (see Example 1 below) which demonstrates that proppant crush can actually increase permeability under certain conditions. If the fracturing slurry contains particulates which are subject to crushing at the closure stresses, such a crush, however, may induce generation of channels (flow paths) in the pack, and hence enhances permeability, which is then insignificantly affected by closure stress magnitude. The crushable particulates may be approximately spherical or in the form of plates, disks, platelets, flakes, sheets, cylinders, rods, scales, husks, chips, shells and mixtures thereof (see Examples 2 and 3 below). If not spherical, the crushable particulates may have any aspect ratio.

Alternatively, the fracturing slurry may contain crushable particulates of low specific gravity. Such particulate material may be chosen from a variety of lightweight materials, including, but not limited to, ceramic hollow spheres, glass microspheres and microballoons, cenospheres, plerospheres (char and ash cenospheres which have their cavities filled by finer particles of ash and other materials), various porous materials, including rocks and minerals, ceramics, cements, polymers; and various composite materials and mixtures of such materials. The preferred material is cenospheres, hollow spherical ceramic particles made of aluminum and silica, which are a byproduct of coal combustion and are found in fly ash. The particles are filled with air and have apparent specific gravities of from about 0.4 to about 0.8 g/cm³. Their primary use is as fillers for cements to make low density concrete (see Example 4 below). However, placement of such lightweight particulates deep into a fracture or complex fracture network may be easily achieved by means of fluids of low viscosity, i.e. slickwater, because the particles are generally buoyant. When the fracture is closed, the particulates are subjected to crush, which generates particle fragments, which still prop the remote fractures open, thus providing permeability sufficient for hydrocarbon production enhancement.

Alternatively, the crushable proppants of the Invention may be particulates made of materials with closed porosity, for example glass and ceramics, rocks and minerals, polymers and plastics, metals and alloys, composite materials, biomaterials and combinations of such materials. Such closed porosity materials may have fibrous, arch/cellular, mesh, mesh/cellular, honeycomb, bubble, sponge-like or foam structures and combinations of such structures. Any proppant under sufficient closure pressure is a crushable proppant.

Alternatively, the crushable proppants of the Invention may be crushed into fragments due to hydrostatic pressures encountered during pumping into the reservoir. In this case, fine mesh proppant materials are created in situ during pumping. An example is fine mesh materials that are delivered to the location in a granulated/pelletized form. Crushing of the aggregates during pumping or fracture closure reduces dusting and other handling risks encountered at the surface. Cenospheres and other fragile particulates fall into this category; at least a portion of their crushing may occur during pumping, not necessarily under formation closure stress.

Alternatively, the proppant may include a mixture of plate-like or, as other examples, rod-like or cylinder-like and either approximately spherical particles or irregular particles so that the plates or, as other examples, rods or cylinders will trap the spheres or irregular particles in between layers. This increases the permeability of the pack of plates or, as other examples, rod-like or cylinder-like materials. Then, under stress, the spheres may be a failure point (if they are lower strength than the plates) or an initiation point for the plates to crack (if they have higher crush strength than the plates). Before any cracking of plates occurs, the permeability should be higher with the spheres.

It is preferred that crushing of the crushable proppants of the Invention produces particulates which are less than an order of magnitude smaller than the parent particles. The size distribution of the crushed material may be determined by experiments such as the API RP 56 test described below.

All or a portion of the crushable particles may be coated to increase their strength, alter their wettability, provide higher closed porosity and thus better transport properties, reduce fines formation, decrease the friction during pumping or decrease their adhesion to each other. Suitable materials for enhancing the properties may include quaternary hydrophobic or hydrophilic absorbents, adsorbed surfactants, silicones, fluorocarbons, or polymers which impart desirable surface properties to the particles. As another example, crushable proppant can be coated with resin coating that would provide higher crush resistance, thereby providing higher conductivity during the initial flowback of the well where stresses are lower to enhance fluid cleanup, and then the resin coated particles crush at higher stresses during production to create a fine mesh pack. Further, the particle faces can be etched by chemical or optical methods to make the surfaces rough rather than smooth to enhance permeability.

The proppants and methods of the Invention are particularly suitable to very tight formations, which, as used herein, refers to formations having a permeability less than about 1 millidarcy, and in various embodiments, less than about 100 microdarcy, less than about 10 microdarcy, less than about 1 microdarcy, or less than about 500 nanodarcy. These formations have such low permeability that the wells can be effectively stimulated in one embodiment with an overall or primary final fracture conductivity on the order of 0.3 to 30 mD-m (1 to 100 mD-ft) and/or with secondary and/or tertiary fractures on the order of 0.0003 to 3 mD-m (0.001 to 10 mD-ft), where secondary fractures are understood to refer to usually relatively smaller fractures in length and/or width, branching from the primary fractures, and tertiary fractures refer to usually relatively smaller fractures in length and/or width, branching from the secondary fractures. As an example, the crushable proppants of the Invention may be used for treating formations with permeabilities less than 0.001 mD where the proppant loading is less than about 4.88 kg/m$^2$ (1 lb/ft$^2$), preferably less than about 2 kg/m$^2$ (0.5 lb/ft$^2$). As another example, the crushable proppants of the Invention may be used for treating formations where the generated fractures are not substantially lateral but may include a mixture of induced lateral and transverse flow paths; the proppant is transported throughout the network of induced flow paths. Crushable proppant can be continually injected or slugs of larger particles can be used to promote transport.

Because the effectiveness of the final proppant pack does not rely on the porosity or permeability of the packed matrix of the proppant as injected to impart flow conductivity to the fracture, the availability of the option to select a wider range of proppant materials can be an advantage in embodiments of the present invention. For example, the proppant may have a range of mixed, variable diameters, shapes, strengths or other properties that yield a suitable proppant pack after closure and crushing of at least some of the proppant. If the proppant as injected is uniform in properties, at least some of it must be crushed; if the proppant is a mixture of different materials or of one material but a mixture of, for example, sizes and/or shapes, then at least one of the different proppants must be at least partially crushable under closure conditions. The crushable particles make up from about 10 percent to about 100 percent of the total particles in the fluid, preferably from about 30 to about 100 percent. The preferred concentration of crushable particles in the fluid is from about 0.1 to about 1200 kg/m$^3$ (10 ppa), most preferably from about 120 kg/m$^3$ to about 240 kg/m$^3$ (0.1 to about 2 ppa). The other proppant material may, for example, be conventional proppant materials, such as sands, ceramics, sintered bauxites, glass beads, minerals, polymers, plastics, naturally occurring and composite materials and combinations of these materials.

Optionally, conventional proppants may be used to fill that portion of the fracture nearer the wellbore where, because of the size and geometry of the fracture created, the advantages of the crushable proppants of the Invention may not be needed. (The nearer the wellbore, typically the wider and less complex the fracture.) This conventional proppant may have a crush strength above the closure pressure. This conventional proppant material may, for example, be conventional proppant materials, such as sands, ceramics, sintered bauxites, glass beads, minerals, polymers, plastics, naturally occurring and composite materials and combinations of these materials.

Any surface and downhole equipment, any pumping schedule, and any fracturing or slickwater fluids, may be used with the crushable proppants and methods of the Invention, provided only that the crushable particles are not substantially broken by the equipment before they reach the final pack position. Optionally, the equipment/proppant can be engineered to break the proppant prior to placement—for example in the wellbore (in situ crushing), see Example 7 below. Any additives conventionally used in fracturing or slickwater fluids may also be used. When applied with low viscosity fluids that have difficulty in transporting conventional proppants, such as slickwater, higher concentrations of the crushable proppant can be employed as that reduces the settling rate. Alternatively, the practice of alternating slugs of slickwater without proppant and slickwater with proppant can be eliminated and proppant can be continuously added to the slickwater. This practice reduces the use of water which can have a significant impact on the economics and simplifies the pumping operation. The amounts and concentrations of total proppant can also be the same as for treatments of similar formations with similar fluids without crushable proppants.

While the fundamental connection is believed to exist, no correlations have yet been reported between material compressive strength and proppant crush resistance. The latter is usually estimated for conventional proppants according to the API RP 56 method in a special crush cell under different applied loadings. The fines generated are measured by means of sieve analysis and compared with the data prescribed by the API RP. The easiest way to define the crushable particulate proppants of the Invention is to define them as those which do not meet the API RP 56 crush resistance specifications. Note that therefore we define "fines" as being any particles produced by crushing of the original proppant.

API RP 56 describes the crush test as being done in a press having platens that can be maintained parallel and apply a load; the cell typically has an inside diameter of 5.08 cm (2 inches) and a piston length of 8.89 cm (3.5 inches). Proppant of a given mesh size range is placed in the cell at a concentration of 19.5 kg/m$^2$ (4 lb/ft$^2$), which for the cell described is 40 g, and leveled by inserting the piston and rotating it in one direction. A load is applied, taking 1 minute to reach the maximum, and held for 2 minutes. The load is released and the proppant removed and sieved in a sieve shaker for 10 minutes. Any particles smaller than the smallest mesh size loaded are considered fines. Results are compared to the suggested specifications given in Table 1:

TABLE 1

| Mesh Size (U.S.) | Mesh Size (mm) | Stress (psi) | Stress (MPa) | Maximum Fines |
|---|---|---|---|---|
| 6/12 | 1.68-3.36 | 2000 | 13.8 | 20 |
| 8/16 | 1.19-2.38 | 2000 | 13.8 | 18 |
| 12/20 | 0.84-1.68 | 3000 | 20.7 | 16 |
| 16/30 | 0.59-1.19 | 3000 | 20.2 | 14 |
| 20/40 | 0.42-0.84 | 4000 | 27.6 | 14 |
| 30/50 | 0.297-0.59 | 4000 | 27.6 | 10 |
| 40/70 | 0.21-0.42 | 5000 | 34.5 | 8 |
| 70/140 | 0.105-0.21 | 5000 | 34.5 | 6 |

The present invention can be further understood from the following examples.

EXAMPLE 1

A tube with a fixed inner diameter is filled with fragile spherical proppant particles having nearly the same diameter as the tube (see FIG. 1A). In this case, before closure stress is applied, the tube will have almost zero permeability; even though the total porosity of the pack might be quite high, the porosity available for fluid flow is negligible. Once an external closure stress is applied, and the inner diameter is reduced, the proppant particles start crushing (FIG. 1B), the total pack volume decreases and so does the total pack porosity. However, the proppant crushing leads to opening of pore space and the relative effective porosity (which is a fraction of the total porosity) increases, which results in an increase in the tube permeability.

EXAMPLE 2

Figure 2:
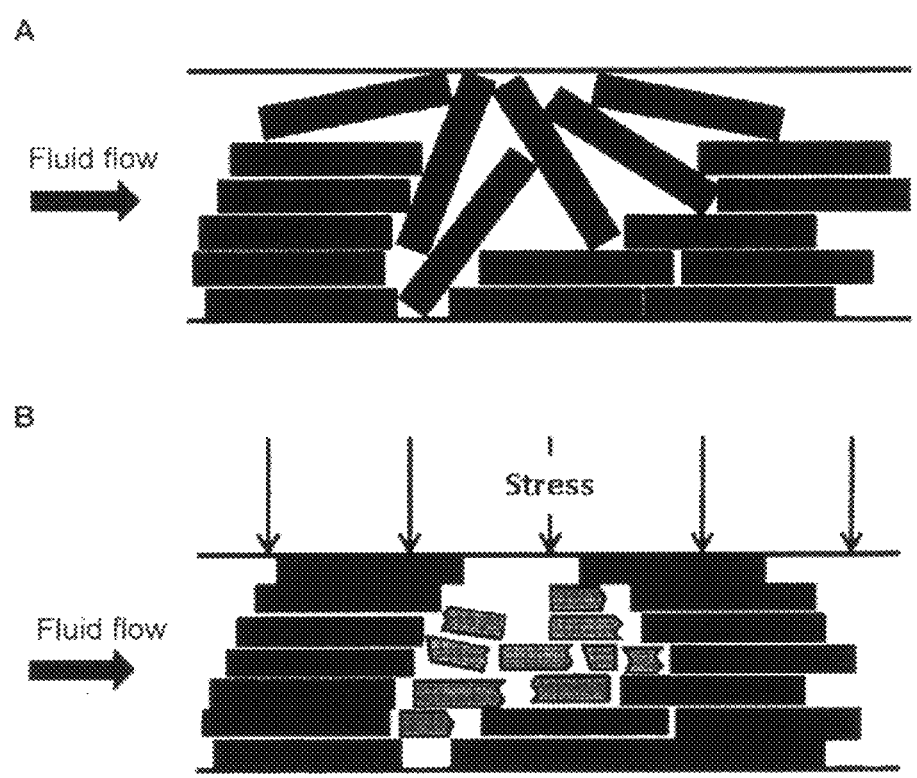
FIG. 2 shows packs of plate-like particles in a fracture.

For non-spherically shaped materials, for example plates, this effect can be even more pronounced, as the conditions in this latter case are much closer to those encountered in the field, as compared to those in the first example. Consider non-spherical particles, for example plates, in a fracture having parallel walls. Without any externally applied stress, the particles are oriented randomly (except perhaps for some orientation induced by transport fluid flow) and a substantial fraction of the pack porosity is confined (see FIG. 2A). Once the stress is applied, the particles tend to align with the walls and some of them are crushed, opening flow channels (see FIG. 2B). The effect of closure stress on the permeability of the pack therefore may be quite complicated, and permeability and effective porosity generally can increase with closure stress applied on the pack. A similar result can be obtained with rods and/or cylinders.

Laboratory Experiments

Materials

A commercial muscovite mica sample was obtained from Minelco Specialties Limited, Derby, UK. It was designated MD250; the number in the code represents the approximate maximum flake diameter in microns. The thickness of these mica particles was about 20 to 25 microns. The manufacturer described the material as dry ground, highly delaminated potassium aluminum silicate Muscovite Mica flakes having a melting point of about 1300° C., a specific gravity of about 2.8, a pH of about 9 as a 10% slurry in water, and as being flexible, elastic, tough, and having a high aspect ratio. The MD250 material is 99.9% smaller than 250 microns, 10-50% smaller than 125 microns, and 0-15% smaller than 63 microns.

Cenospheres were obtained from Sphere Services, Inc., Oak Ridge, Tenn., USA; they are lightweight, inert, hollow spheres made of silica and alumina and filled with air and/or gases. Cenospheres are a naturally occurring by-product of the burning process at coal-fired power plants, and they have most of the same properties as manufactured hollow-sphere products. The size given by the manufacturer is 10 to 350 microns.

Standard Conductivity Apparatus

The conductivity apparatus consisted of a 90, 700 kg (100 ton) load press with automated hydraulic intensifiers and API conductivity cells having 64.5 cm$^2$ flow paths. The apparatus could attain a maximum closure stress of 138 MPa and a maximum temperature of 177° C. The temperature of the conductivity cells was controlled by electrically heated platens contacting the sides of the cell. Precision metering pumps were used to pump brine through the cell during flowback and conductivity measurements. The pumps drew 2 wt % KCl brine from a 20 l flowback reservoir. The brine was vacuum degassed and nitrogen sparged to prevent the introduction of metal oxides into the proppant pack. The brine was pumped through a silica saturation system prior to entering the conductivity cell. Rosemount pressure gauges (with upper limits of 690 Pa, 62 kPa and 2 MPa) were used to measure the pressure drop across the conductivity cell. Digital linear variable displacement transducers or telescope width gauges were used to measure the distances between the cores to monitor fracture widths. The conductivity apparatus was automated for controlling closure stress ramps, flow schedules and temperature, as well as providing data acquisition and real-time conductivity/permeability calculations.

Split Core Apparatus

A Formation Response Tester (FRT) Model 6100 obtained from Chandler Engineering (Broken Arrow, Okla., USA) was used for split core conductivity measurements. A proppant pack was placed between two metal semi-cylindrical cores, which were inserted into a rubber sleeve, in place of the traditional cylindrical rock core sample. The confining pressure was applied to the sleeve with a manual hydraulic pump. The fully automated core flow instrument allowed the operator to sequence various fluids (including acids) through a core sample. The system was designed to handle acids and other corrosive fluids at temperatures up to 177° C. The core could be up to 3.81 cm in diameter and up to 17.1 cm long. Operating pressure and temperature were limited to 41.4 MPa and 177° C. The direction of flow was flexible; flows from top to bottom, across the core face, and bottom to top (system flush) could all be done. The differential pressure was measured across the core sample using two Rosemount precision differential pressure sensors. During the execution of a test, conductivity was measured using a 0 to 2.75 MPa differential pressure transducer or a 0 to 41.4 MPa transducer, depending on the range and level of precision required.

EXAMPLE 3

Figure 3:
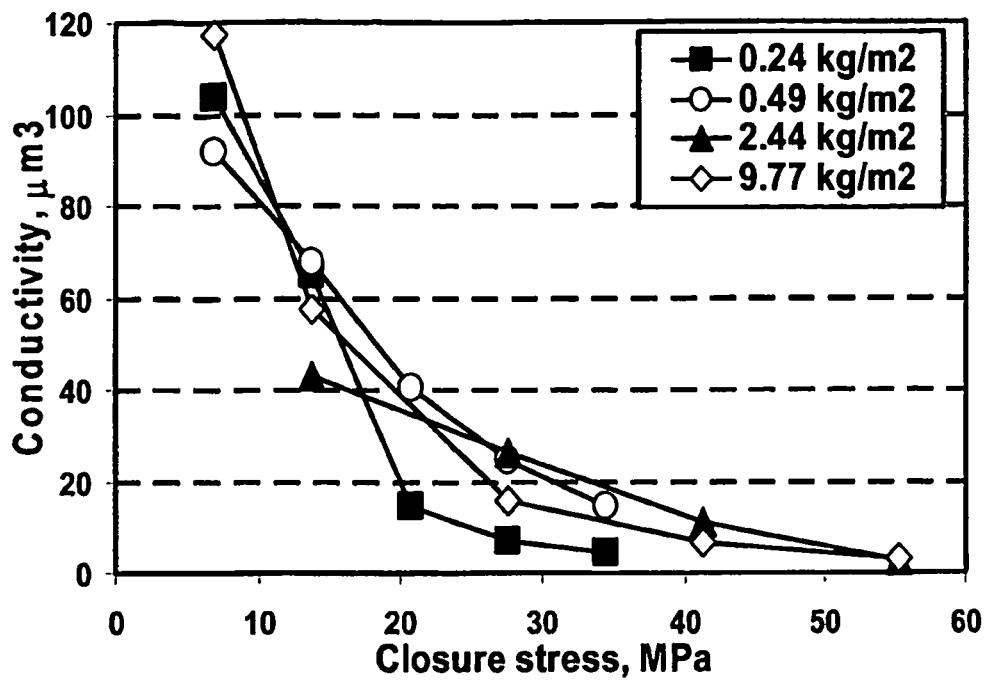
FIG. 3 shows experimental proppant pack conductivities of muscovite mica at various proppant loadings and various closure pressures.
Figure 4:
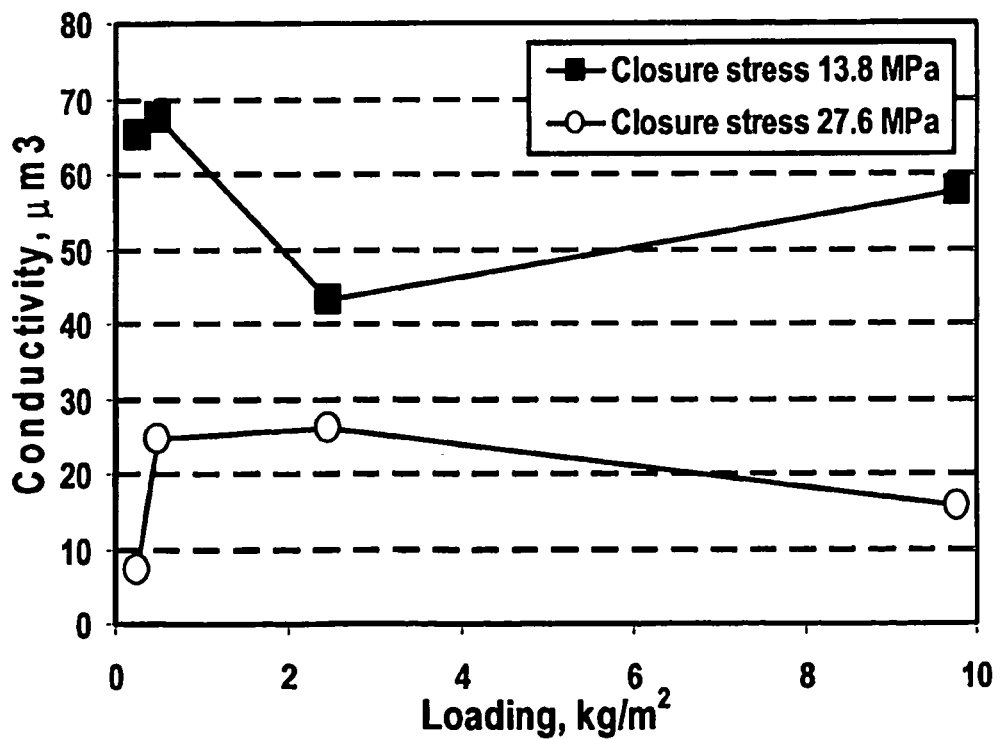
FIG. 4 shows the dependence of mica pack conductivity on proppant loading at various closure stresses.

The conductivities of muscovite mica MD250 packs at proppant loadings of 2.44 and 9.77 kg/m$^2$ were measured with the standard conductivity apparatus, while special precautions were taken to avoid parasitic flows due to the low proppant pack permeabilities. (Compared to conventional proppant packs, the packs of plate-like mica particles were characterized by very low conductivities and by non-conventional stress distributions in the packs. Ohio sandstone cores are usually used for API conductivity tests; however, in our case flows through such cores were possible, which would have strongly affected conductivity results. Other parasitic flows might have existed due to unusually high pressure drops in the cells (up to 1.72 MPa (250 psi)), e.g. flows along the conductivity cell walls. Other challenges in conductivity measurements of mica packs have been faced. Special precautions used included: a) utilization of aluminum cores instead of sandstone ones; b) sealing the core edges with room temperature vulcanized rubber; c) sealing the cell walls with a silicon vacuum grease.) The conductivities of the mica packs at proppant loadings of 0.49 kg/m$^2$ and below were measured by means of the split-core apparatus. The steady state conductivity data for the mica packs are presented graphically in FIG. 3. The conductivities of the packs depended only weakly on the proppant loadings, as shown in FIG. 4. In this range of proppant loadings the conductivity would have been expected to be proportional to the proppant loading. Formation of channels in the pack decreased this dependence, as is demonstrated in FIG. 4.

EXAMPLE 4

Figure 5:
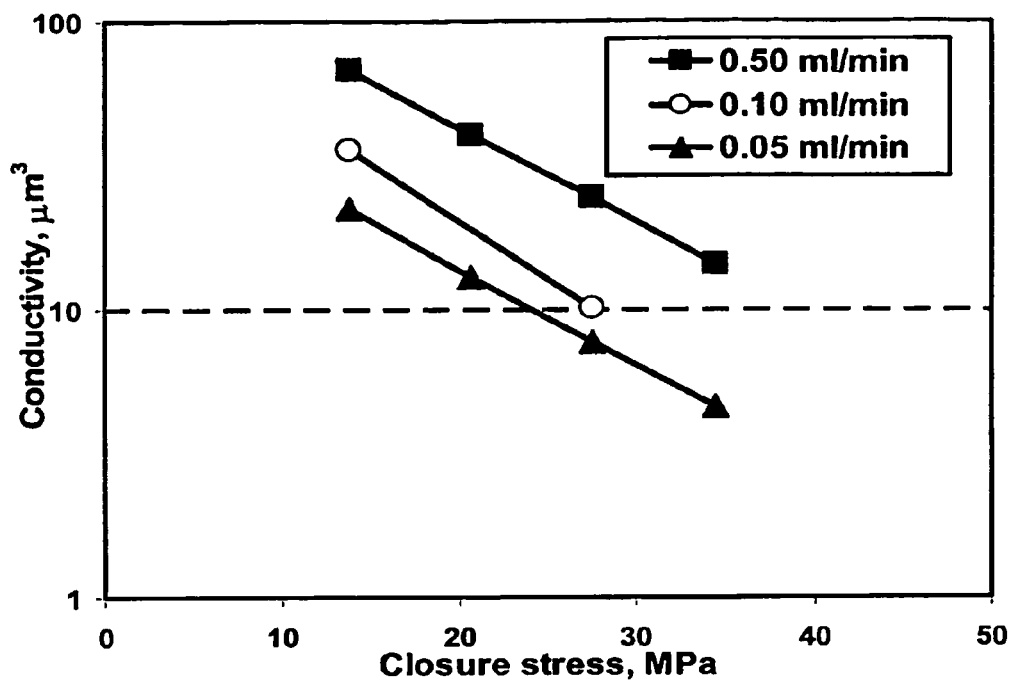
FIG. 5 shows experimental proppant pack conductivities of muscovite mica MD250 at a proppant loading of 0.49 $kg/m^2$ at various closure pressures and various flow rates.

The conductivity of a 0.49 kg/m² mica pack was found to be strongly dependent on flow rates, as shown in FIG. 5. The formation of channels in the mica packs was observed when the conductivity cell was disassembled. The higher the flow rate, the more channels could be seen.

EXAMPLE 5

Figure 6:
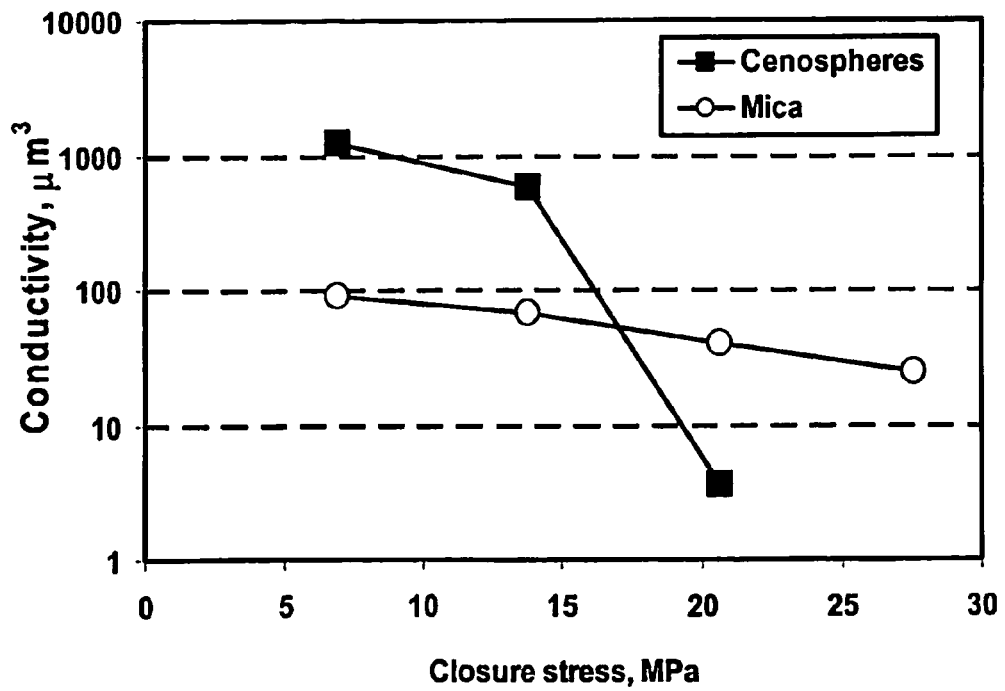
FIG. 6 shows conductivity data for cenospheres and mica at a proppant loading of 0.49 $kg/m^2$ under various closure stresses.

The conductivity of 0.49 kg/m² cenospheres was measured and compared with that of mica. The cenospheres exhibited a drastic drop in conductivity at closure stresses above 14 MPa, due to particle failure, as shown in FIG. 6. However, the retained conductivity may be sufficient to enhance production from extremely low permeable unconventional reservoirs, for example gas shales where conductivities as low as 1.4 mD-cm (0.05 mD-ft) are acceptable in secondary and tertiary fractures.

EXAMPLE 6

Figure 7:
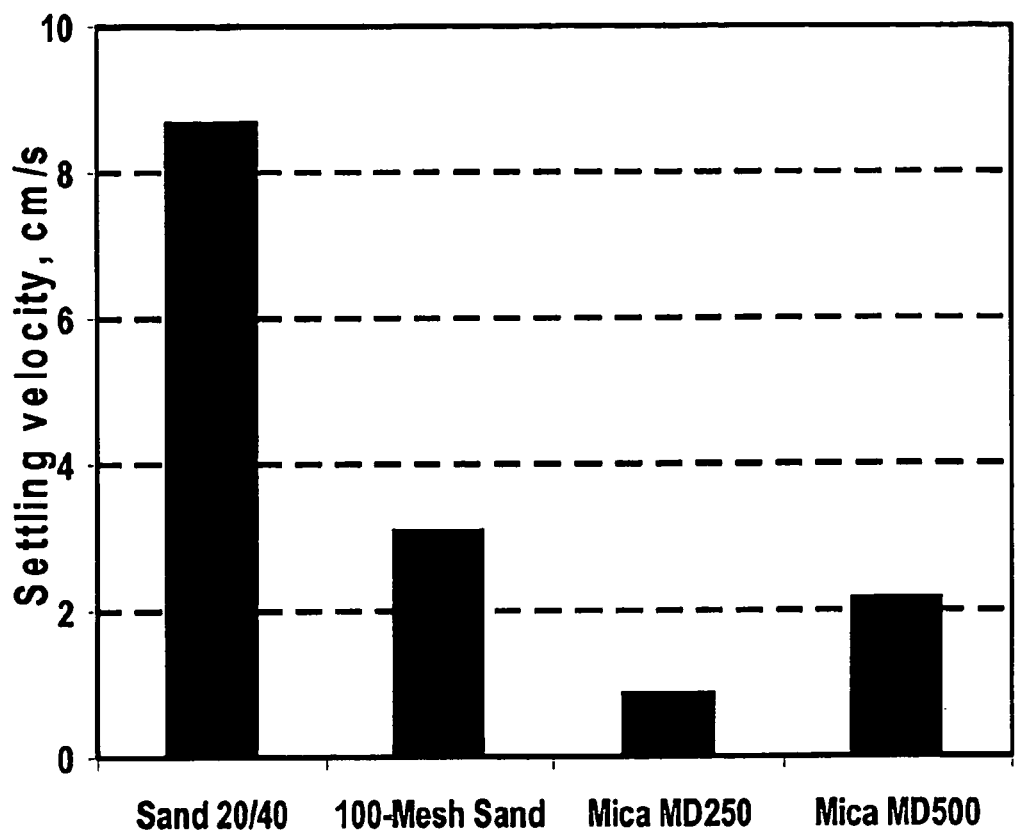
FIG. 7 compares experimental settling velocities of conventional fracturing sands and mica flakes.

Static proppant settling measurements were performed in slickwater, comprising tap water containing 0.05 wt. % of a polyacrylamide-based friction reducer. The fluid was placed into a 500 ml graduated cylinder with a ruler fixed on its side. A portion of proppant slurry (proppant in slickwater, 1:1 by volume) was slowly introduced into the cylinder with a spatula and the settling front was photographed at 1-2 second intervals. The falling front path was calculated and the terminal settling velocity was determined from the linear part of the curve path vs. time. Three replicate measurements were made for each material in each fluid, and the velocities were averaged. The settling velocities are shown in FIG. 7. Mica flakes demonstrated significantly slower settling rates than the conventional silica sands that are widely used as proppants. Cenospheres did not exhibit any settling at all, as the particles were floating on the slickwater surface.

EXAMPLE 7

Figure 8:
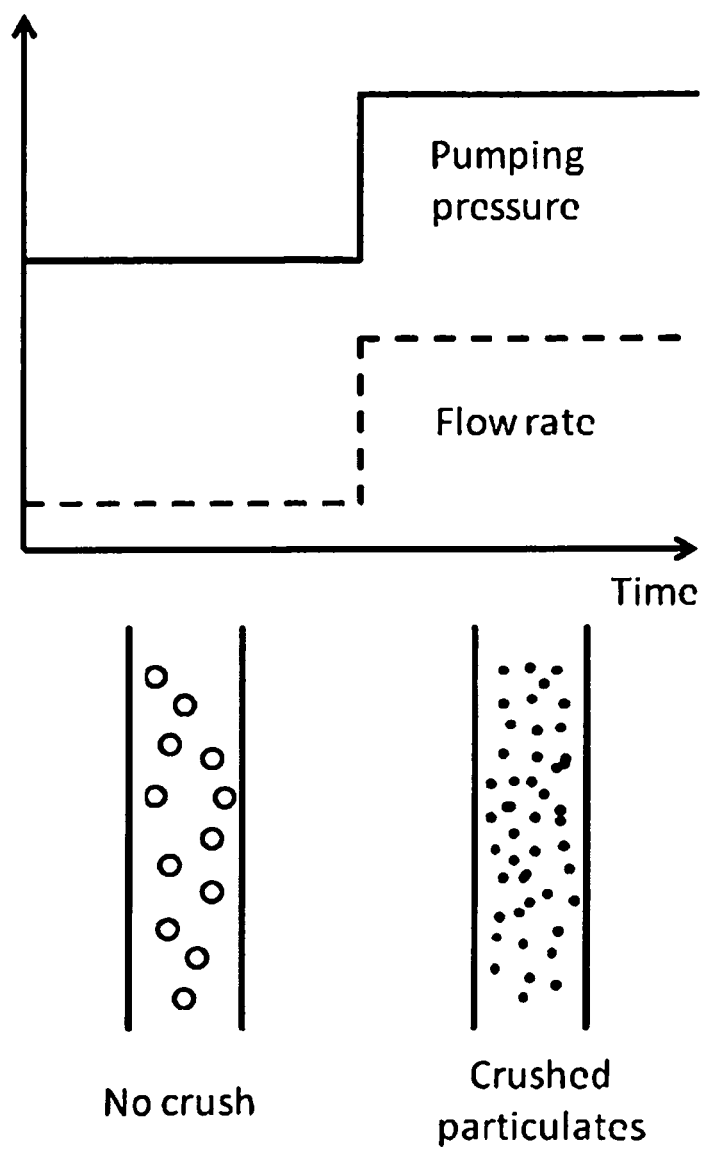
FIG. 8 shows pressure profile during a job, when increase of hydraulic pressure leads to crush of proppant particulates.

Hydraulic pressure change during a job can be used to control the crush of proppant particles. This allows to prevent dusting of fine mesh proppant materials during surface handling operations. As depicted in FIG. 8 at relatively low treatment flow rates the hydraulic pressure remains low and does not impact proppant particles. Once the pressure is increased above the hydraulic strength of the particles they start crushing generating fines either in the wellbore or in the fracture.

Having thus described our invention, we claim:

1. A method of hydraulic fracturing a subterranean formation penetrated by a wellbore comprising (a) estimating the closure stress in a fracture, (b) selecting a crushable proppant that produces more than about 20 percent fines in a crush test using that closure stress, (c) injecting a slurry of the proppant in a carrier fluid into the formation, wherein the formation has a permeability of less than about 0.001 mD and the proppant loading is less than about 4.88 kg/m², and (d) Injecting a slurry in which the proppant is not crushable.

2. The method of claim 1 wherein the crushable proppant is in the form of spheres, plates, disks, rods, cylinders, platelets, flakes, sheets, scales, husks, chips, shells, lumps and mixtures thereof.

3. The method of claim 1 wherein the crushable proppant comprises particles of at least two different shapes that have at least two different crush strengths.

4. The method of claim 1 wherein the crushable proppant comprises particles of at least two different materials that have at least two different crush strengths.

5. The method of claim 1 wherein the crushable proppant is selected from the group consisting of ceramic hollow spheres, glass or ceramic microspheres and microballoons, cenospheres, plerospheres and combinations thereof.

6. The method of claim 1 wherein the crushable proppant comprises materials with closed porosity.

7. The method of claim 6 wherein the materials with closed porosity, are selected from the group consisting of glass and ceramics, rocks and minerals, polymers and plastics, metals and alloys, composite materials, biomaterials and combinations thereof.

8. The method of claim 6 wherein the materials with closed porosity have fibrous, arch/cellular, mesh, mesh/cellular, honeycomb, bubble, sponge-like or foam structures and combinations thereof.

9. The method of claim 1 wherein the crushable proppant comprises finer material that has been formed into larger particles by agglomeration or binding.

10. The method claim 1 wherein the crushable proppant is coated.

11. The method of claim 1 wherein the crushable proppant comprises from 10 to 100% of the total solids in the slurry.

12. The method of claim 1 where a cycle of alternating proppant types is repeated a plurality of times.

13. The method of claim 1 wherein a portion of the crushable proppant is crushed during step (c).

14. The method of claim 1 wherein a portion of the crushable proppant is crushed when the fracture closes after step (c).

15. The method of claim 1 consists of at least 10 weight percent of mica or cenospheres or mixtures thereof.

16. The method of claim 1 wherein the crushable proppant is continuously added to a carrier fluid injected into the formation.

17. The method of claim 1 wherein the crush strength of the crushable proppant is chosen so that at least a portion of the crush occurs after initial cleanup of the well.

18. The method of claim 1 wherein settling velocity of the crushable proppant is less than that of 150 micron sand.

* * * * *